(No Model.) 2 Sheets—Sheet 1.
A. A. GEHMAN.
INCUBATOR.
No. 321,712. Patented July 7, 1885.
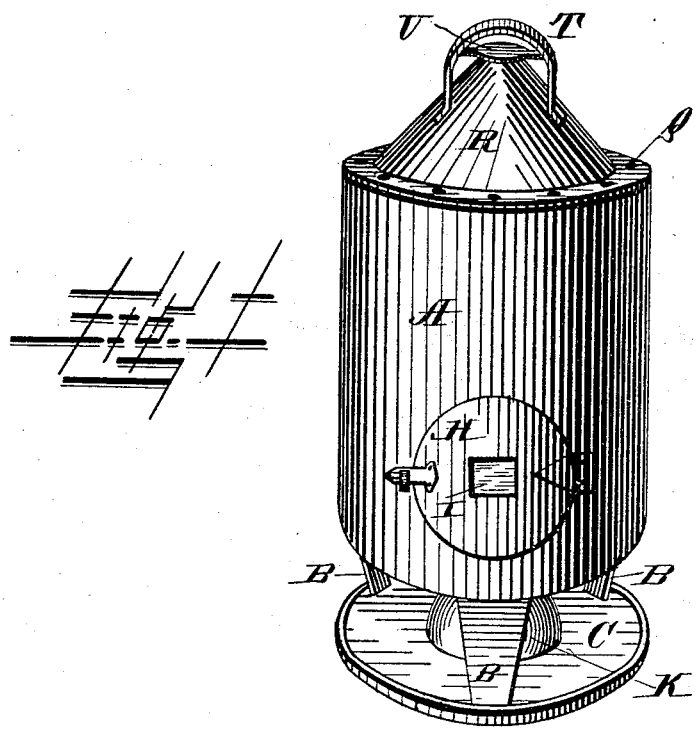
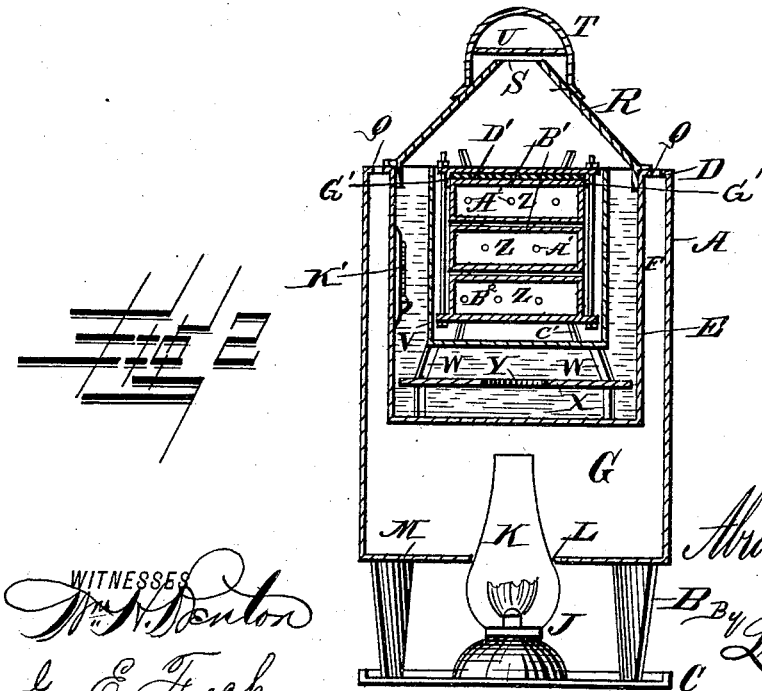
WITNESSES
Wm. N. Benton
Geo. E. Frech
Abraham A. Gehman
INVENTOR
By Louis Bagger & Co.
his Attorneys.

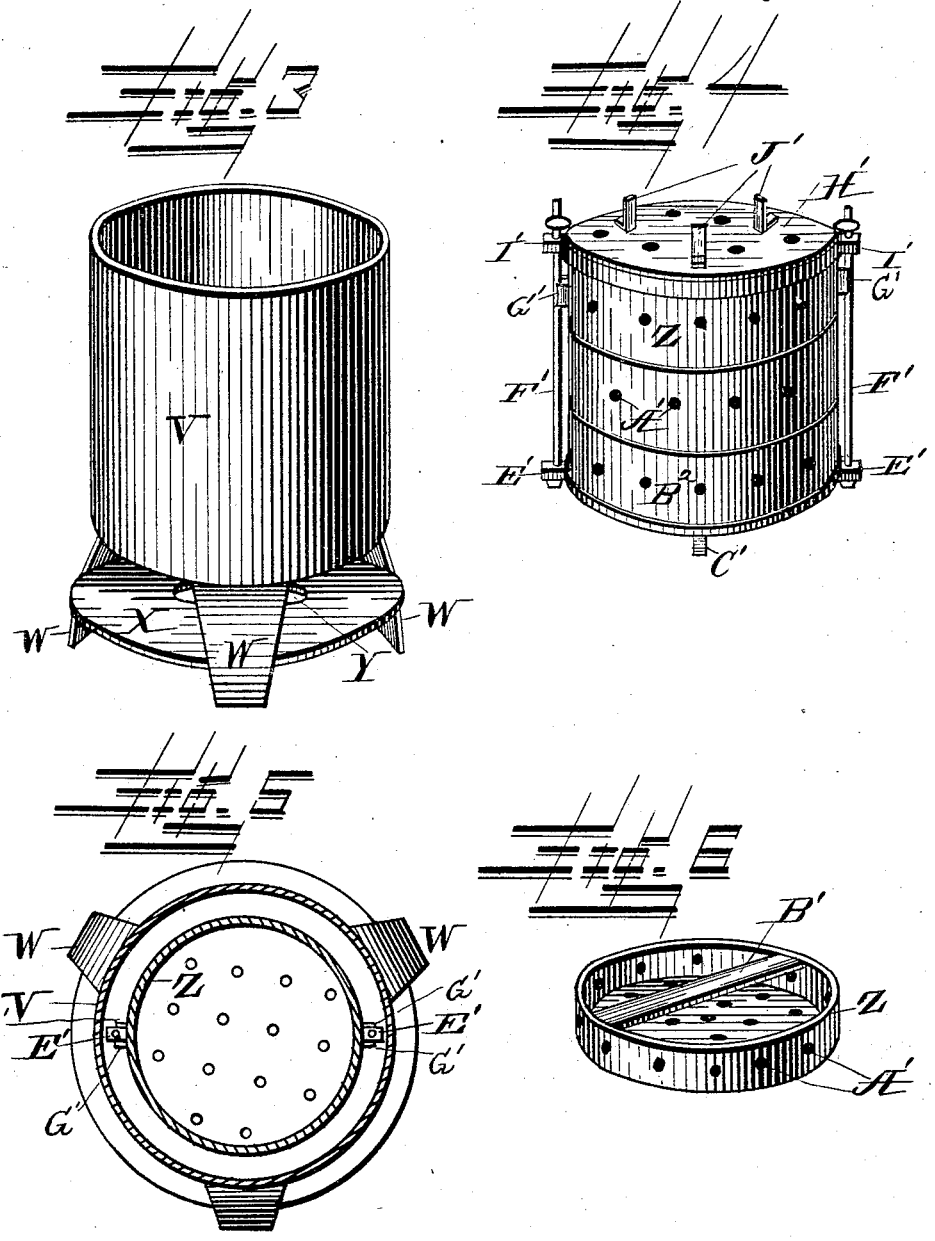

UNITED STATES PATENT OFFICE.

ABRAHAM A. GEHMAN, OF NEWTON, KANSAS.

INCUBATOR.

SPECIFICATION forming part of Letters Patent No. 321,712, dated July 7, 1885.

Application filed February 25, 1885. (No model.)

*To all whom it may concern:*

Be it known that I, ABRAHAM A. GEHMAN, a citizen of the United States, and resident of Newton, in the county of Harvey and State of Kansas, have invented certain new and useful Improvements in Incubators; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved incubator. Fig. 2 is a vertical transverse sectional view of the same. Fig. 3 is a detail view in perspective of the egg-holder removed from the casing. Fig. 4 is a perspective view showing the egg-baskets removed from the holder and connected for the purpose of reversing the same. Fig. 5 is a horizontal sectional view of the egg-holder with the egg-baskets in position, and Fig. 6 is a perspective detail view of one of the egg-baskets removed from the holder.

The same letters refer to the same parts in all the figures.

This invention relates to incubators; and it has for its object to provide a device of this class which shall possess superior advantages in point of simplicity, durability, and inexpensiveness and general efficiency.

With these ends in view the invention consists in the improved construction and arrangement of parts, which will be hereinafter fully described, and particularly pointed out in the claims.

In the drawings hereto annexed, A designates the body of my improved incubator, which consists of a cylindrical or other suitably-constructed casing supported upon legs B B, the lower ends of which are attached to a flanged base, C, forming a drip-pan.

The upper edge of the casing is provided with an inwardly-extending flange, D, to the inner edge of which is attached a vessel, E, extending downwardly within the casing, between which and the said vessel is a space, F. The casing has below the bottom of the vessel E a chamber, G, provided with a door, H, through which access may be had to the interior of the casing. The door H has a pane, I, of mica, through which the interior may be observed without necessity for opening the door.

The contents of the vessel E is heated by an ordinary lamp, J, which is placed upon the base, and the chimney K of which extends through an opening, L, in the bottom M of the casing, and which serves to direct the heat directly against the bottom of the vessel E. The air which is admitted through the opening L on becoming heated ascends through the space F between the casing and the vessel E, the contents of which is thus kept in a sufficiently-heated state, and it finally escapes through the openings Q Q, formed for the purpose in the flange D.

The vessel E is provided with a closely-fitting conical cover, R, having at its apex an opening, S, and a bail or handle, T, between the sides of which is secured a plate or deflector, U, which serves to deflect the vapors arising from the interior of the incubator, while it will allow sufficient air for ventilation to enter through the aperture in the cover.

V designates the egg-holder, which consists of a suitable receptacle mounted upon legs W W, between which is secured a deflecting diaphragm, X, having a central perforation, Y, which causes a portion of the heat to which the holder is subjected to strike the bottom of the holder, while the remainder of the heat is deflected around the sides of the latter. Placed in the said holder are a series of egg trays or baskets, Z Z, constructed of sheet metal, to fit neatly within the said holder, and provided with ventilating perforations A' A', and having cross-pieces B' at their upper ends, serving as handles. The lowermost egg-basket, which is distinguished by letter B², is mounted upon low legs or supports C' C', so as to relieve it from direct contact with the bottom of the holder, thereby making provision for proper ventilation, and preventing overheating of the contents. Of the egg baskets or trays, any desired number may be used to fill the holder, and the uppermost one is to be covered with a mat, D', of any suitable material.

The lowermost basket, B², is to be provided with a pair of laterally-extending lugs, E' E', through which pass a pair of rods or bolts, F' F', extending upwardly outside the remaining baskets to the top of the uppermost basket, which is provided with ears G' G', between which the rods are held.

H' designates a top piece or cover, fitted to the uppermost egg-basket, and having perforated lugs I' I' to receive the upper ends of the rods or bolts F'. The latter are screw-threaded, and provided with thumb-nuts at both ends. The top piece or cover is provided on its upper side with legs or supports J', corresponding with those of the lowermost egg-basket.

When it is desired to turn the eggs, it is only necessary to place the top piece or cover in position upon the uppermost egg-basket and connect it to the rods F' F', upon which the thumb-nuts are then tightened. The entire set of egg-baskets with their contents may then be lifted out and reversed, thereby saving much time and trouble, and avoiding all danger of chilling the eggs.

In the vessel E, which is in practice to contain water which is kept warm by the lamp underneath, is placed an ordinary thermometer, K', by means of which the temperature of the water may be at any time readily ascertained by removing the cover and lifting the thermometer out of the vessel.

My improved incubator, which may be made of any desired size and capacity, is to be constructed of sheet metal—such as sheet iron or tin—and the bottom of the vessel E, which is exposed to the flame of the lamp, is, for the sake of durability, preferably constructed of sheet-copper.

From the foregoing description, taken in connection with the drawings hereto annexed, the operation and advantages of my invention will be readily understood.

The eggs are placed in the trays or baskets, and these again in the holder, which latter is placed in the vessel E, where it is surrounded with water. The cover is then placed in position, and the lamp, to which access is had through the door in the front of the casing, lighted, thus raising the temperature of the water to the desired degree, at which it may be easily maintained by well-known obvious means. As the water evaporates it will condense by contact with the inner side of the conical cover, and trickle back into the vessel E. Proper ventilation is supplied through the opening in the top of the cover.

It is obvious that the eggs are at all times supplied with the necessary moisture, which, as is well known, is a necessary condition to their successful hatching.

The general construction of my improved incubator is simple and inexpensive. It is safe and easily managed.

Having thus described my invention, I claim and desire to secure by Letters Patent of the United States—

1. In an incubator, the combination of a casing having a central perforation in its bottom, a perforated flange at its upper end, a water-vessel attached to said flange and extending downward within the casing, a chamber in said casing below the water-vessel having a door provided with a pane of mica, legs supporting the said casing and attached to a flanged base, a lamp placed upon the said base and having its chimney extending through the central perforation in the bottom of the casing into the lower chamber thereof, and a conical condensing and ventilating cover for the water-vessel, substantially as and for the purpose herein set forth.

2. In an incubator, the combination, with a casing, a water-vessel, and heating apparatus, constructed substantially as described, of the conical cover having at its apex a ventilating-opening, a bail or handle, and a deflector secured between the sides of the latter, substantially as and for the purpose herein set forth.

3. In an incubator, the herein-described egg-holder, consisting of a suitable receptacle, legs supporting the same, and a deflector or diaphragm secured between said legs below the bottom of the holder, and having a central perforation, substantially as and for the purpose herein set forth.

4. The combination, with the egg-holder, of the egg baskets or trays consisting of perforated sheet-metal pans, the lowermost one of which is supported upon low legs, and all of which are provided with cross-pieces or handles, and a mat covering the uppermost egg-tray, substantially as and for the purpose herein set forth.

5. The combination of the egg-holder, the bottom basket having legs or supports and laterally-projecting lugs, the upper egg-baskets, the top piece or cover having upwardly-projecting legs and laterally-projecting perforated lugs, and the connecting rods or bolts and thumb-nuts, substantially as and for the purpose herein set forth.

6. As an improvement in incubators, the combination of a casing having a bottom with a central perforation and mounted upon legs secured to a flanged base, a water-vessel secured to a perforated flange at the upper end of the casing and extending downwardly within the latter, a lamp, the chimney of which extends through the central perforation in the bottom of the casing, a door at the lower end of the latter, a conical cover for the water-vessel, said cover being provided at its apex with an opening and a handle, between the sides of which is secured a deflector, an egg-holder mounted upon legs, between which is secured a deflector having a central perforation, the egg-trays arranged in said holder, all of said trays being provided with transverse handles and the lowermost one with low legs, a mat covering the uppermost tray, a top piece or cover having upwardly-extending legs, and means for connecting all said egg-trays and the top piece or cover, all arranged and operating substantially as and for the purpose herein shown and specified.

In testimony that I claim the foregoing as my own I have hereunto affixed my signature in presence of two witnesses.

ABRAHAM A. GEHMAN.

Witnesses:
W. P. HOLMES,
SAMUEL F. GEHMAN.